May 5, 1964 H. F. WELSH 3,132,214

MAGNETIC RECORDER HEAD ASSEMBLY

Filed May 13, 1960

2 Sheets-Sheet 1

INVENTOR.
HERBERT F. WELSH

William G. Miller Jr.
AGENT

May 5, 1964 H. F. WELSH 3,132,214

MAGNETIC RECORDER HEAD ASSEMBLY

Filed May 13, 1960

2 Sheets-Sheet 2

INVENTOR.
HERBERT F. WELSH

William G. Miller Jr.
AGENT

United States Patent Office 3,132,214

Patented May 5, 1964

3,132,214

MAGNETIC RECORDER HEAD ASSEMBLY

Herbert F. Welsh, Philadelphia, Pa., assignor to Sperry Rand Corporation, New York, N.Y., a corporation of Delaware Filed May 13, 1960, Ser. No. 28,881
4 Claims. (Cl. 179—100.2)

This invention relates to electro-magnetic transducer heads of the type utilized for recording and reproducing on a magnetizable medium. More specifically, this invention concerns the structure of head assemblies for recording and reproducing information in conjunction with a magnetic record member passing in close proximity with the head assembly.

In the past, the magnetic head assemblies utilized for the reproduction of magnetic records have generally been fixed in position with regard to the record member so that the channels swept by each of the magnetic heads were established by the fixed positional relationship between the head assembly and the record member. When utilizing magnetic recording head assemblies in conjunction with large magnetic recording drums, for example, it has recently been the practice to utilize magnetic head assemblies which comprise a plurality of recording and reproducing heads which are mounted as an assembly and which are not coextensive with the recording surface of the drum unit. These assemblies, instead of remaining in a fixed position, are moved as by a servo-mechanism such as that disclosed in a paper entitled "A Large-Capacity Drum-File Memory System," published in the Proceedings of the Eastern Joint Computer Conference, December 1956, pages 136–138. The moving or stepping is to a preselected one of a number of predetermined positions as may be required to provide complete coverage of the recording surface of the drum by the multiple head assembly. Normally, the selection of any one channel, as might be required for reading or writing serial information therein, requires a mechanical positioning of the head assembly to one of the predetermined positions and then electrical selection of the desired head unit of the assembly. This electrical selection may be carried out by a number of known switching circuits.

In the past, these head assemblies have accomplished the erasing function by the use of a separate erasing head for each of the channels covered by the separate transducer heads of the assembly. This is particularly the case when the erasing function cannot advantageously be accomplished as a result of writing new information as, for example, when high density recording is to be performed with a minimum of writing current.

In arrangements utilizing separate erase heads, it has been necessary to not only select electrically the particular transducer head which is to be utilized for writing, but also to simultaneously selectively energize the corresponding erase head to erase the channel prior ot writing. This arrangement has necessitated a large number of electrical connections to head assemblies utilizing a plurality of separate heads. It is, of course, desirable to eliminate as many of the electrical connections as possible without sacrificing any of the desired functions of the head assembly.

The positioning mechanism for the head assembly is subject to a certain amount of inaccuracy in repositioning the head assembly to any particular position. This inaccuracy will cause the magnetic heads to record on an area which may not include all of the area recorded on when the head assembly was previously at that same position. Under such conditions, the recording operation itself will fail to erase all of the previously recorded information even though the recording current may be high and a subsequent reading operation on the same channel might, due to the same inaccuracy, pick-up spurious signals from such unerased portions.

It is, therefore, an object of this invention to provide a new and improved magnetic head assembly having a plurality of head units.

It is another object of this invention to provide a magnetic head assembly having a number of head units and a minimum number of electrical connections for performing the erase function.

It is another object of this invention to provide a magnetic recording head assembly having both a recording head and heads for erasing areas including at least a portion of the area on each side of the channel being recorded as well as the edges of the channel itself.

Another object of this invention is the provision of a plural channel magnetic head assembly having erasing heads for erasing the edges of the channels during a writing operation.

In accordance with this invention, there is provided an improved electro-magnetic transducer head assembly, hereinafter referred to as a magnetic recording head assembly, which includes a first magnetic head adjacent to a magnetic record member for reading and writing information on that record member.

The length of the pole pieces of this first magnetic head transverse to the direction of relative movement of the record member with respect to the head defines the width of the channel swept by the head. The head assembly also includes a second magnetic head adjacent the record member which sweeps an area including a portion of the fringe area adjacent the channel defined by the first magnetic head as well as a portion of the edges of that channel. The second magnetic head may be positioned to either lag or lead the first magnetic head and is energized during the writing operation to erase or trim the edges of each channel before new information is written in order to prevent old information from remaining where it might be picked up in a future reading of the same channel.

The foregoing advantages, objects and novel features of this invention as well as the invention itself both as to organization and mode of operation may be best understood from the following description when read in connection with the accompanying drawings, in which like reference numerals refer to like parts, and in which.

Figure 1:
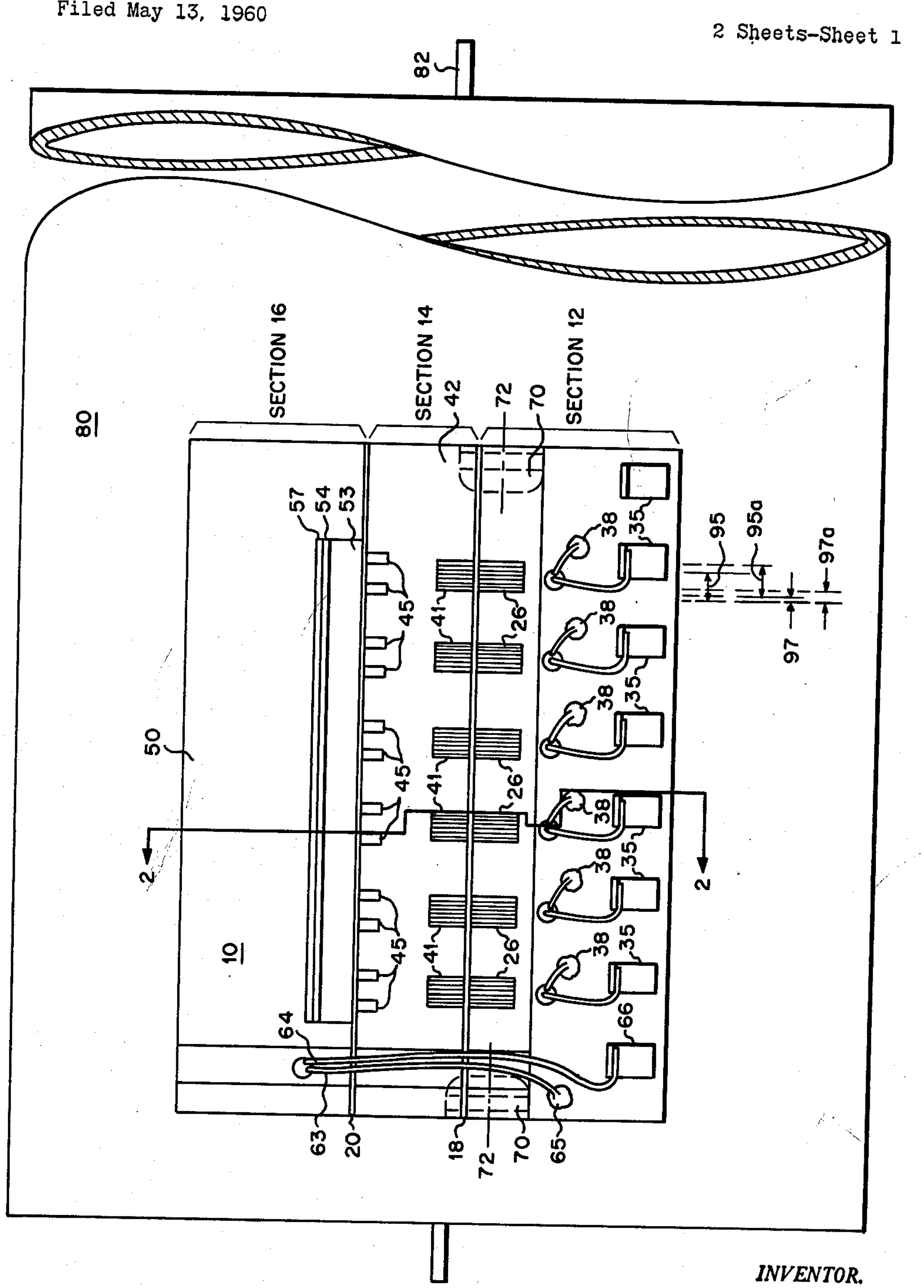
FIGURE 1 is a top-view of a recording drum system with a plural-channel magnetic head assembly embodying this invention.
Figure 2:
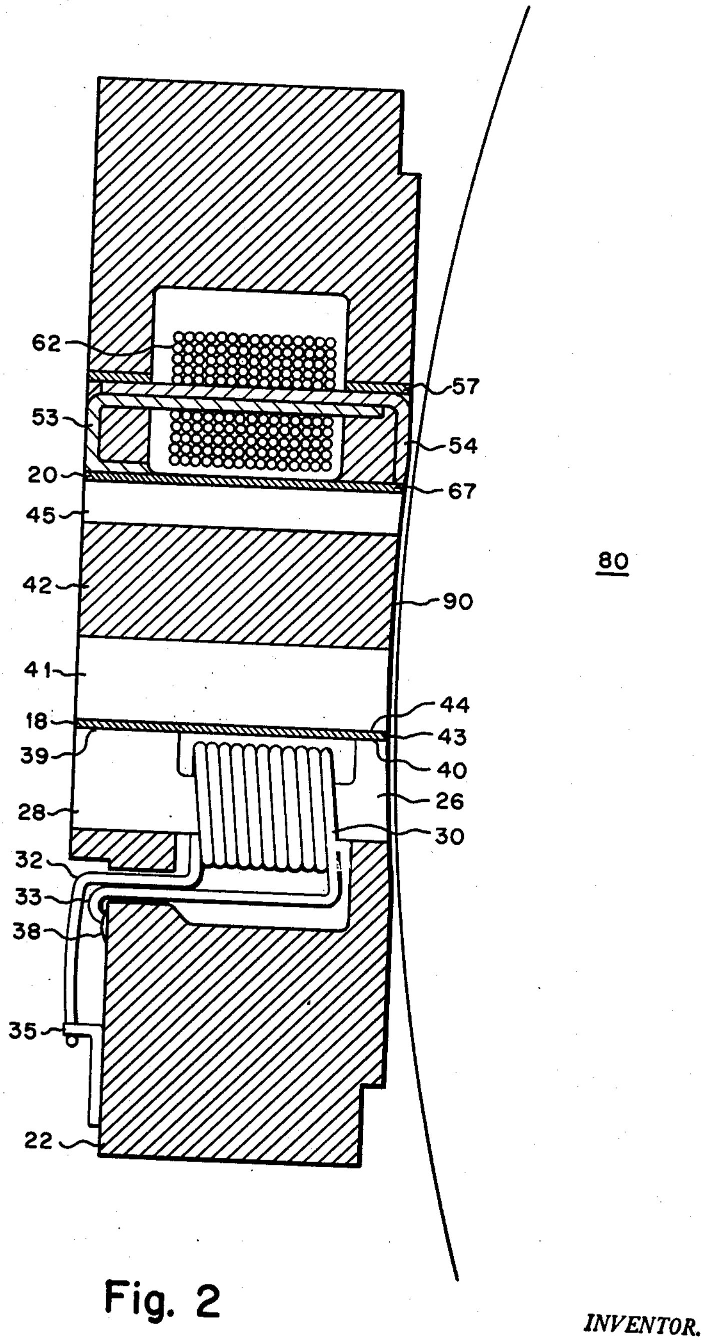
FIGURE 2 is a cross-section view taken along the line 2—2 of FIGURE 1.

The structural arrangement of one embodiment of this invention is shown in FIGURES 1 and 2, wherein the head assembly 10 comprises sections 12, 14 and 16. These sections are separated by non-magnetic spacers 18 and 20 and the sections and spacers may be joined by the use of a suitable cement.

The head assembly 10 has six separate head units and thus covers six channels. These six channels may be spaced to cover alternate channels on the record surface in order that the separate head units of the head assembly may be sufficiently widely spaced so that there is a minimum interaction between the magnetic fields established by each of them. Section 12 of head assembly 10 is made up of a body member 22 which supports a portion of each of the six individual head units 26. This portion of each of the head units 26 comprises a stack of C-shaped laminations 28. Each stack has an energizing coil 30 linking the narrow portion of the stack of laminations and connected by connecting wires 32 and 33 to terminal 35 and solder spot 38.

The laminations 28 are designed to provide a larger surface on the intergap face 39 of the stack 28 than at the intergap face 40 at the recording end in order that the flux produced across the non-magnetic gap at the intergap face 40 as established by spacer 18 is caused to fringe, thus establishing recording flux through the area outside that between the confronting intergap pole faces 40 and 44.

The second section 14 of the head assembly comprises a body member 42 supporting the remaining portion of the magnetic circuit for each of the several magnetic heads. These portions consist of stacks of laminations 26 and 41 which stacks are co-extensive with the stacks 26 and are spaced therefrom by the non-magnetic spacer 18 providing another pole face 44 confronting pole face 40.

The laminations 41 are mounted along one face of section 14; along the opposite face of section 14 are single laminations 45 each positioned to overlap an edge of the associated channel established by the confronting pole faces 40 and 44.

Two lamina 45 for each pole piece 41 are spaced apart a distance slightly less than the thickness of the stack of laminations 41 of the associated channel.

The body member 42 and the laminations 41 and 45 are secured to each other by a suitable cement.

The section 16 of the head assembly comprises a body member 50 which supports the means for producing the magneto-motive force for the trim heads 45. This means includes a magnetic core fabricated from elements 53 and 54. The elements 53 and 54 are assembled to overlap each other, as shown in FIGURE 2. These elements extend over the entire area covered by the trim heads 45 for all the channels. The assembled elements 53 and 54 form a magnetic core which is linked by winding 62 which is, in turn, connected by wires 63 and 64 respectively to a solder spot 65, providing a common return circuit through the body 50, and a terminal 66. The assembled core, made up of elements 53 and 54, is supported by the body member 50 and is separated therefrom by a shim 57 which may, for example, be made of a non-magnetic material such as copper. The section 16 is joined to the section 14 by way of an interposed non-magnetic spacer member 20. The non-magnetic member 20 defines the gap 67 between the trim edge 45 and the energizing portion of the magnetic circuit including element 54.

As shown in FIGURE 1, the head assembly 10 is provided with recessed areas 70 for receiving pivots which will allow the head assembly to pivot about an axis 72.

The head assembly 10 may be advantageously utilized for the recording and reproduction of information in the form of magnetic records on a drum, such as drum 80, which rotates about an axis 82. In order to read and record magnetic information on the drum 80, the drum must have its peripheral surface coated with a magnetizable medium such as iron oxide and the head assembly 10 must be positioned to maintain a close proximity between the peripheral surface of the drum 80 and the non-magnetic gaps 67 and 43. One method of maintaining the desired spacing between the drum and the head assembly while still retaining the ability of the head to be moved from one position on the drum surface to another position is to utilize a head assembly designed to "fly" over the drum surface. As is known to those skilled in the art, a head assembly, such as 10, which is pivoted about axis 72 transverse to the direction of motion of drum 80, can be designed so that the head assembly and more particularly the shape of the surface 90 adjacent the drum surface provide for the support of the head assembly by the ambient fluid carried by the drum surface as the drum rotates. Such an arrangement utilizes the well known principle of the Kingsbury bearing. The utilization of this principle allows the maintenance of a small spacing between the drum surface and the head assembly in spite of the normal deviations of magnetic drums from a perfect cylindrical form. The surface 90 of the head assembly may desirably have a radius conforming to that of the drum 80, as shown in FIGURE 2.

In the construction of the head assembly 10, the various parts mentioned above may be assembled, as pointed out above, by the use of a suitable cementing material, and in addition, the assembly may be potted to fill in the voids remaining between the various elements.

In operation, the head assembly 10 may at one time be positioned along drum 80 so that the head element at the extreme right of the head assembly 10, as shown in FIGURE 1, records information by the phase modulation method, for example, in a channel 95 having the same width as the stacks of laminations 26 and 41.

After continual repositioning of the head 10 in order to read and write information on other channels on the drum 80, it may be desirable to return and write new information in channel 95. In positioning the head 10 for such a writing operation it may develop that the registration between the gap 43 and the channel 95 is not perfect so that the new information is recorded in channel 95*a* (co-extensive with laminations 26 and 41, as shown) instead of 95. In order to prevent any of the previously recorded information from remaining in path 97 (the portion of channel 95 not overlapped by channel 95*a*) it is desirable to erase during the writing operation an area defined by the width of the trim heads 45, as for example, the path 97*a* swept by the trim head 45 along the left hand edge of channel 95*a* and overlapping channel 95*a*. This trim head may either lead or lag the transducer head gap 43, i.e. the trim head arrangement of FIGURE 1 may be used for either direction of rotation of the drum 80. The trim head receives a D.C. energization from coil 62 during all writing operations to erase the information in the path 97*a*. If the error in repositioning head 10 as represented by the different positions of channels 95 and 95*a* is, for example, the maximum expected in one direction then the left hand edge of path 97*a* may coincide with the left hand edge of channel 95 as shown in FIG. 1. The thickness of the trimmers 45 and, thereby, of the trim path 97*a* corresponds to the expected maximum variation in head positioning. The writing operation, itself, at gap 43 effectively removes the information in channel 95*a* as new information is written. The erasure of information previously written in the path 97*a* is accomplished by the corresponding trim head 45 and prevents a future reading operation from picking up any of the old information in the event that the gap 43 is positioned to span channel 95 during the reading operation. The inaccurate positioning of the head assembly 10, thus, does not cause the introduction of spurious signal in coil 30 during reading. The other trim heads 45 similarly erase paths overlapping each of the edges of the channels swept by the gaps 43 of the other head units in head assembly 10 upon energization of coil 62. Coil 62 is normally energized whenever a writing operation is being performed by any of the heads at their gaps 43.

It will be evident that during any writing operation it is only necessary to energize one coil, namely, 62, to effect the necessary erasing function. Consequently, only two lead wires are required for the erase heads and no individual selection is required, for all erase heads are energized simultaneously during a writing operation regardless of the number of heads which are being utilized for writing.

What is claimed is:

1. A multichannel magnetic recording head assembly having a plurality of magnetic heads each comprising first magnetic head means having a first magnetizable core, a transducer coil linking said first core, said first core having confronting pole faces forming a first non-magnetic gap adapted for reading and writing information on a magnetic record member movable relative to said head assembly and in close proximity to said gap, the length of the said pole faces of said first core transverse to the direction of relative movement of said record member establishing a corresponding information channel on the record member, second magnetic head means having a second magnetizable core, an erase coil linking said core, said second core having confronting pole faces forming a second non-magnetic gap extending transverse to the direction of relative movement of said record member the width of said second gap being sufficient to establish an erase path covering a small portion along an edge of said channel and an area just adjacent to said edge.

2. A multichannel magnetic recording head assembly comprising a plurality of magnetic recording heads positioned in said assembly for sweeping separate spaced channels of a record member, each of said heads having a first stack of laminations forming a first portion of a magnetic path, a transducer coil linking said first stack of laminations, a second stack of laminations forming a second portion of said magnetic path and positioned so that a first non-magnetic gap is formed between said second stack and said first stack; and a plurality of trim heads spaced along said assembly to form other magnetic paths, said trim heads including a single magnetic core forming a portion of each of said other magnetic paths formed by said trim heads, said single magnetic core being at least co-extensive with said spaced channels swept by said plurality of recording heads, an energizing coil linking said single magnetic core, and a plurality of magnetic cores each forming another portion of each of said other magnetic paths and providing pole faces confronting said single core and positioned so that said pole faces each form a second non-magnetic gap, the width of said second gap being sufficient to sweep a portion of each of the edges of said channels and a portion of the area adjacent each of said edges and outside said channels.

3. A multichannel magnetic recording head assembly having a plurality of magnetic heads for recording information in a plurality of channels of a magnetic record member, each magnetic head comprising a first magnetic head means having a magnetizable core linked by a transducer coil and forming a first non-magnetic gap in recording communication with said record member, said first gap being positioned to sweep an area of said record member corresponding to the channel to be written, a second magnetic head means having a magnetizable core linked by an erase coil and forming a second non-magnetic gap in operative magnetic communication with said record member, said second gap being of sufficient width and so positioned as to sweep areas including only the edge portions of the channel swept by said first head means and areas just adjacent thereto whereby upon energization of said erase coil unwanted signals in said edge portion and said adjacent area of said channel are erased during recording in said channel.

4. A multichannel recording head assembly comprising a first, second and third section, said first section including a first body member, a plurality of laminated magnetic cores supported in spaced relationship along said first body member for sweeping a corresponding plurality of channels on a magnetic record member relatively movable thereto, and a separate transducer winding linking each of said stacks; said second section including a second body portion, a plurality of laminated magnetic cores supported by said second body member in a similar spaced relationship to said cores of said first section, and a plurality of other magnetic cores supported by said second body member and spaced thereon having a width sufficient to sweep an area overlapping the edges of said channels; and said third section including a third body member, a single core supported by said third body member and extending across said other magnetic cores supported by said second body member, an erase coil linking said single core; and means for joining said first, second and third sections with non-magnetic spacers interposed between said first and second sections and said second and third sections so that a non-magnetic gap is established at a surface of said head assembly between each of the plurality of laminated cores supported by said first body member and corresponding laminated cores supported by said second body member as well as between the said other magnetic cores supported by said second body member and the said single core supported by said third body member.

References Cited in the file of this patent

UNITED STATES PATENTS

| | | |
|---|---|---|
| 2,538,892 | Begun | Jan. 23, 1951 |
| 2,668,878 | Munroe | Feb. 9, 1954 |
| 2,736,776 | Camras | Feb. 28, 1956 |
| 2,927,974 | Stovall | Mar. 8, 1960 |
| 2,987,582 | Naiman | June 6, 1961 |